Patented Sept. 14, 1926.

1,599,748

UNITED STATES PATENT OFFICE.

HEINZ EICHWEDE AND ERICH FISCHER, OF HOCHST-ON-THE-MAIN, GERMANY, ASSIGNORS TO GRASSELLI DYESTUFFS CORPORATION, OF NEW YORK, N. Y., A CORPORATION OF DELAWARE.

PROCESS OF DYEING CELLULOSE ETHERS.

No Drawing. Application filed November 9, 1925, Serial No. 68,027, and in Germany November 25, 1924.

It is known that there are only a few acid azo-dyestuffs which yield deep and fast dyeings on cellulose esters or ethers, for instance on acetate silk.—By far most of these acid azo dyestuffs do not dye them at all or give only very weak dyeings of no practical use. Now we have found that diethylaniline-sulfonic acid and its substitution products, when coupled with unsulfonated aromatic diazo compounds of the benzene or naphthalene series containing at least one nitro group, yield dyestuffs which give on cellulose ester, for instance acetate silk, deep tints varying from yellow to violet and possessing good properties as to fastness.

The following example serves to illustrate our invention:—

1 kg. of acetate silk is dyed for 3/4 to 1 hour at 60–70° in a dye bath of 20–25 litres, in which 20 grams of the dyestuff obtained from diazotized 3-nitro-2-methyl-1-aminobenzene with diethylaniline-m-sulfonic acid are dissolved, with or without the addition of a salt or acid or with or without the addition of a protective colloid. In this manner a deep golden-yellow tint of excellent properties as to fastness is obtained.

If in the dyestuff, mentioned in the foregoing example, the 3-nitro-2-methyl-1-aminobenzene used as diazo component is replaced, for instance, by 4-chloro-2-nitro-1-aminobenzene or 4-nitro-2-aminobenzene-1-carboxylic acid ester or a similar base, deep orange tints of equally good fastness are obtained, whereas the dyestuff obtained for instance from 2.4-dinitro-1-aminobenzene and diethylaniline-m-sulfonic acid gives deep reddish-violet tints.

By the term "cellulose ethers" we understand in the following claims not only the cellulose ethers themselves but also the cellulose esters.

We claim:—

1. Process of dyeing cellulose ethers, which consists in dyeing these ethers with monoazo dyestuffs of the following constitution:

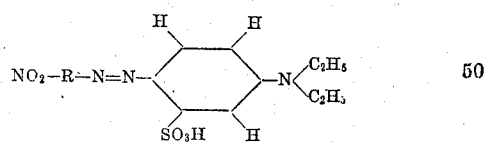

in which R represents a benzene or naphthalene nucleus, substituted or not, but containing no sulfo group, and H stands for hydrogen or any substituent.

2. Process of dyeing cellulose ethers, which consists in dyeing these ethers with the monoazo dyestuffs of the following constitution:

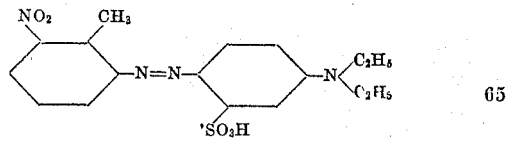

3. As new products, cellulose ethers dyed with monoazo dyestuffs of the following constitution:

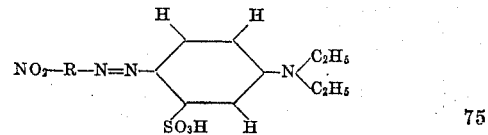

in which R represents a benzene or naphthalene nucleus, substituted or not, but containing no sulfo group, and H stands for hydrogen or any substituent.

In testimony whereof, we affix our signatures.

HEINZ EICHWEDE.
ERICH FISCHER.